United States Patent Office 3,483,232
Patented Dec. 9, 1969

3,483,232
METHOD OF PREPARING STEROIDS AND PRODUCTS RESULTING THEREFROM
John Paul Dusza, Nanuet, N.Y., Joseph Peter Joseph, Cliffside Park, N.J., and Seymour Bernstein, New City, N.Y., assignors to American Cyanamid Company, Stamford, Conn., a corporation of Maine
No Drawing. Filed June 11, 1965, Ser. No. 463,376
Int. Cl. C07c 169/60, 169/20, 167/30
U.S. Cl. 260—397.1    11 Claims This invention relates to steroid compounds. More particularly, the invention relates to a novel method of preparing 3β-alkoxy-Δ⁵-steroids and to new compounds resulting from the said process.

The process of this invention can be illustrated as follows:

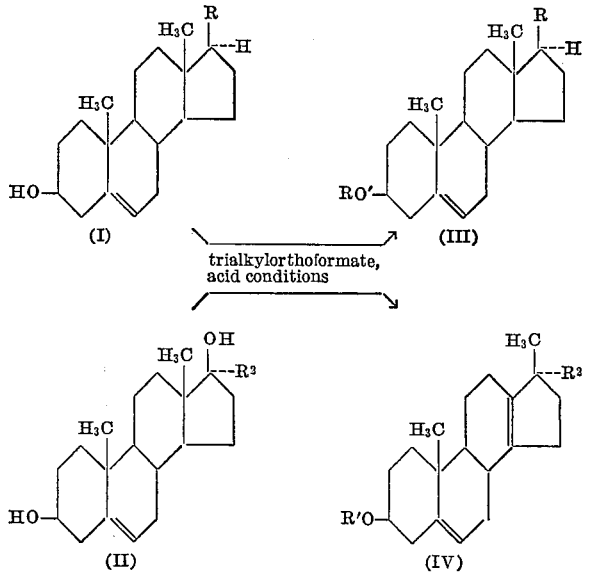

wherein R is selected from the group consisting of hydrogen; hydroxyl;

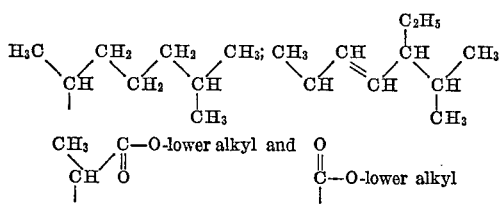

R' is alkyl, R² is selected from the group consisting of lower alkyl and ethynyl.

The process of this invention comprises converting 3β-hydroxy-Δ⁵-steroids (I) into the respective 3β-alkoxy-Δ⁵-steroids (III) thereof by reaction with a trialkylorthoformate. Compounds which can be so converted include, for example, cholesterol, stigmasterol, and the like. Further, the process comprises converting 3β,17β-dihydroxy-Δ⁵-steroids of the androstene series (II) into the respective 3β-alkoxy-Δ⁵-18-nor-steroids (IV) by a like reaction with a trialkylorthoformate. Compounds useful as starting materials in this conversion include, for example, 17α-methylandrost-5-ene-3β,17β-diol and 17α-ethynylandrost-5-ene-3β,17β-diol. Starting materials for either type of conversion have been described in the prior art.

The starting compounds for the preparation of the steroids of structure III above are well known steroids of the following general structure:

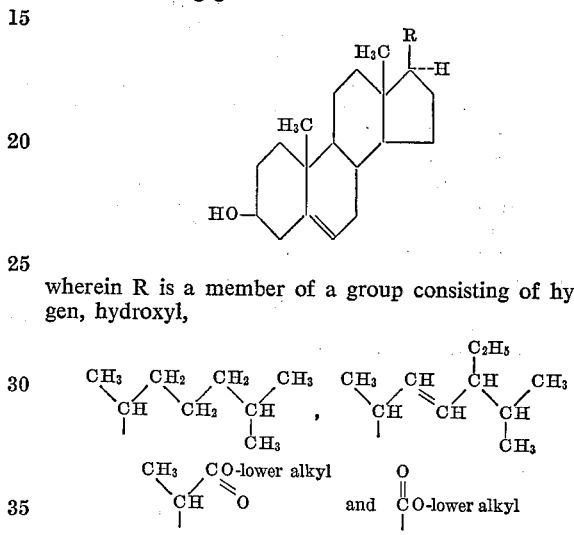

wherein R is a member of a group consisting of hydrogen, hydroxyl,

The starting compounds for the preparation of the steroids of structure IV above are likewise well-known steroids of the following general structure:

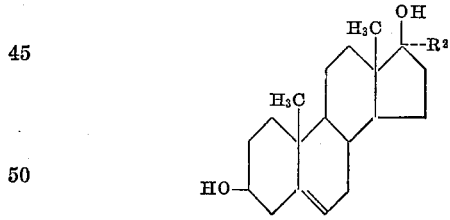

wherein R² is a member of a group consisting of lower alkyl and ethynyl.

The novel process of this invention, however, is not limited to the preparation of the new 3β-alkoxy-Δ⁵-steroids defined above, but is useful in preparing 3β-alkoxy-Δ⁵-steroids in general.

The process of this invention consists of reacting steroid, as described hereinbefore, in solution or suspension with a trialkylorthoformate. Ordinarily the reaction is carried out by adding an excess of an acid such as aqueous perchloric acid (e.g. 72% perchloric acid) or fluoroboric acid with stirring. The mixture can be heated gently for about 2 to 10 minutes or may be left at room temperature for about ten or fifteen minutes. Generally, the reaction is substantially complete after 5 to 15 minutes after the addition of the acid. Frequently the alkoxy-steroid precipitates from the solution and the product is collected by filtration. Where the end product does not precipitate readily, the solution can be neutralized with an acid acceptor such as pyridine. The neutralized reaction mixture is then poured into water and the product is collected by filtration as above. Purification of the end products, in general, may be achieved by recrystallization from appropriate solvents such as methanol. Where two liquid phases were encountered after terminating the reaction, methylene chloride is added and the organic layer is separated and dried with sodium sulfate. On evaporation, a solid residue is obtained which is recrystallized as above. It is generally convenient to carry out the reaction at approximately room temperature, but higher temperatures may be needed at times, as in the preparation of the longer chained steroid ethers.

The choice of the particular alkyl orthoformate employed in the reaction determines the nature of the substituent at C-3. A wide variety of trialkylorthoformates have been found to be reactive, as for example, methyl, ethyl, n-butyl, iso-butyl, amyl, 2-ethyl-hexyl and stearyl.

The present process presents an unexpected and radical improvement in the preparation of $3\beta$-alkoxy-$\Delta^5$-steroids because of its brevity of operation and high yields. The invention presents a process for the direct conversion of a $3\beta$-hydroxy-$\Delta^5$-steroid into a $3\beta$-alkoxy-$\Delta^5$-steroid. Conventional methods heretofore used for this conversion are based on a two-step process; first an initial conversion of the steroid into its corresponding $3\beta$-p-toluene sulfonate and second, the subsequent reaction of the $3\beta$-p-toluenesulfonate to form the $3\beta$-alkoxy steroid with resultant lower yields in multistep processes.

The $3\beta$-alkoxy-$\Delta^5$-steroids of this invention are useful as agents for the lowering of body cholesterol, and therefore have utility as hypocholesteremic agents.

A reaction run with androst-5-ene-$3\beta$,$17\beta$-diol as the starting compound yields a mixture of two new steroids. The reaction may be illustrated as follows:

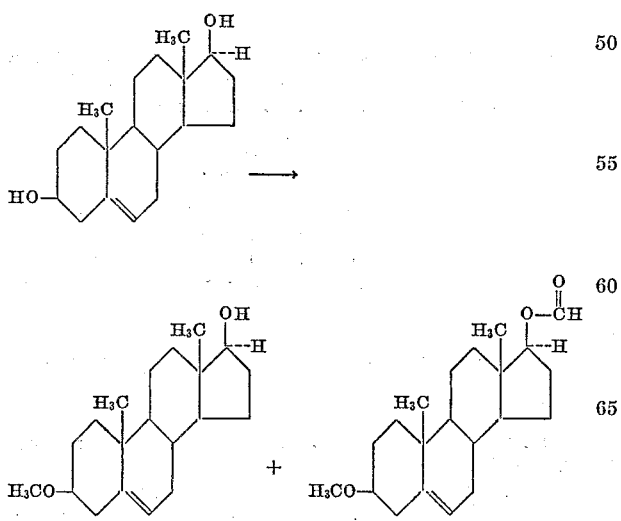

The following reactions have been carried out using the new method to yield the following three new steroids:

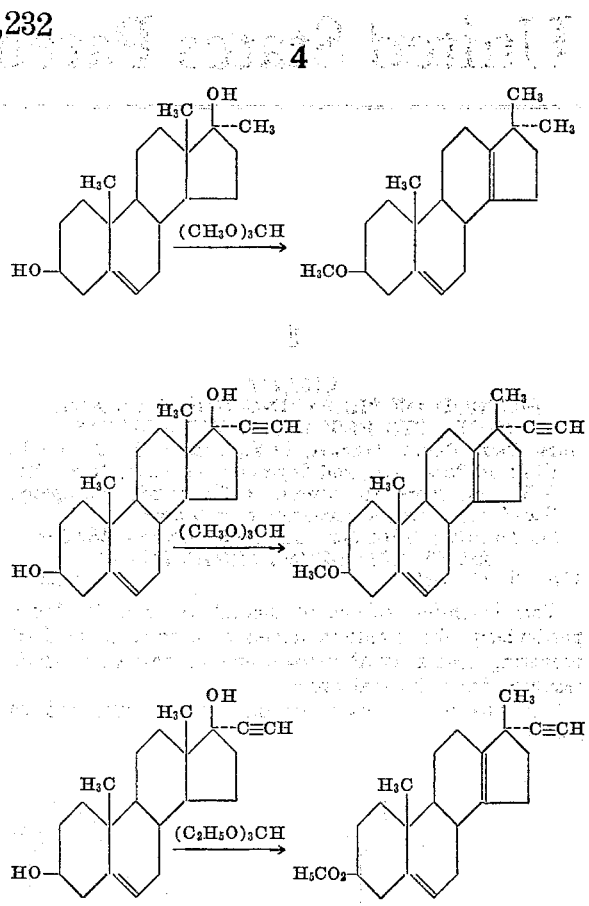

The following examples illustrate in detail the preparation of representative 3-$\beta$-alkoxy-$\Delta^5$-steroids of the present invention.

EXAMPLE 1

Preparation of $3\beta$-methoxycholest-5-ene from cholest-5-en-$3\beta$-ol

A solution of the cholest-5-en-$3\beta$-ol (0.5 g.) in trimethylorthoformate (5 ml.) is stirred at room temperature. The addition of 72% perchloric acid (0.3 ml.) causes an immediate reaction and precipitation. After stirring the suspension for about three minutes, the reaction mixture is poured into a saturated aqueous sodium bicarbonate solution and filtered. The dried precipitate is recrystallized from methanol and the yield of $3\beta$-methoxycholest-5-ene is approximately 400 mg., melting point 83°–84° C.

EXAMPLES 2 to 10

Following the general procedure of Example 1 the following compounds were prepared:

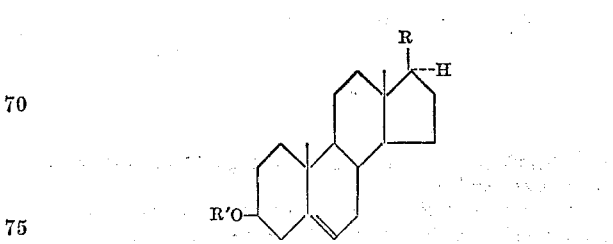

| Example | R' | R | Melting Point, °C. |
|---|---|---|---|
| 2 | CH₃ | CH₃-CH(-CH₂-CH(CH₃)-CH₂-CH(CH₃)-CH₃) | 83-84 |
| 3 | CH₃CH₂ | CH₃-CH(-CH₂-CH(CH₃)-CH₂-CH(CH₃)-CH₃) | 88 |
| 4 | CH₂=CH-CH₂ | CH₃-CH(-CH₂-CH(CH₃)-CH₂-CH(CH₃)-CH₃) | 76-77 |
| 5 | (CH₃)₂CHCH₂ | CH₃-CH(-CH₂-CH(CH₃)-CH₂-CH(CH₃)-CH₃) | 111-112 |
| 6 | CH₃(CH₂)₁₇ | CH₃-CH(-CH₂-CH(CH₃)-CH₂-CH(CH₃)-CH₃) | 59-61 |
| 7 | CH₃ | CH₃-CH(-CH(C₂H₅)-CH-CH(CH₃)-CH₃) | 119-120 |
| 8 | CH₃(CH₂)₃ | CH₃-CH(-CH(C₂H₅)-CH-CH(CH₃)-CH₃) | 105-106 |
| 9 | CH₃CH₂ | H | 72-73 |
| 10 | CH₃(CH₃)₄ | H | 57-58 |

EXAMPLE 11

Preparation of methyl 3β-methoxy-5-etienate

Following the procedure of Example 1 and using methyl 3β-hydroxy-5-etienate in place of cholest-5-ene-3β-ol the compound methyl 3β-methoxy-5-etienate, melting point 134°–135° C. is recovered.

EXAMPLE 12

Preparation of methyl 3β-methoxy-bisnorcholenate

When the procedure of Example 1 is followed using methyl 3β-hydroxy-5-bisnorcholenate as the starting steroid, the compound obtained is methyl 3β-methoxy-5-bisnorcholenate, melting point 118°–120.5° C.

EXAMPLE 13

Preparation of 3β-methoxy-5-androsten-17β-ol and 3β-methoxy-5-androsten-17β-ol-17-formate A procedure, substantially as in Example 1 is followed using androst-5-ene-3β,17β-diol as the starting steroid. The conversion yields both 3β-methoxy-5-androsten-17β-ol, melting point 143°–144° C. and 3β-methoxy-5-androst-en-17β-ol 17-formate, melting point 118°–120.5° C. The compounds are separated from each other by column chromatography.

EXAMPLE 14

Preparation of 3β-methoxy-17,17-dimethyl-18-norandrosta-5,13-diene

Using the procedure substantially as described in Example 1 with 17α-methyl-5-androstene-3β,17β-diol as the starting steroid, the compound 3β-methoxy-17,17-dimethyl-18-norandrosta-5,13-diene is recovered, melting point 93°–94° C.

EXAMPLE 15

Preparation of 17α-ethynyl-3β-methoxy-17β-methyl-18-norandrosta-5,13-diene

When a procedure substantially as in Example 1 is followed using 17α-ethynyl-5-androstene-3β,17β-diol, the compound 17α - ethylyl - 3β - methoxy - 17β - methyl - 18-norandrosta-5,13-diene, melting point 91.0°–92.5° C. is recovered.

EXAMPLE 16

Preparation of 3β-ethoxy-17α-ethynyl-17β-methyl-18-norandrosta-5,13-diene

A procedure, substantially as in Example 1 is followed using 17α-ethynyl-5-androstene-3β,17β-diol and triethylorthoformate which produces the compound 3β-ethoxy-17α-ethynyl-17β-methyl-18-norandrosta-5,13-diene, melting point 79°–80° C.

We claim:

1. A method of preparing steroids of the formulas.

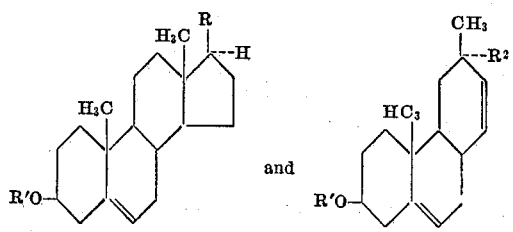

wherein R is selected from the group consisting of hydrogen; hydroxyl;

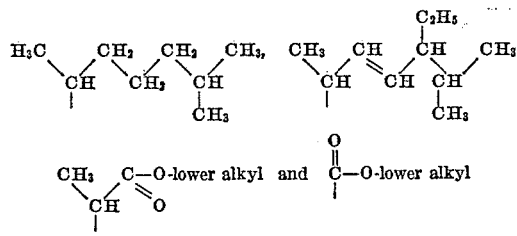

R' is alkyl; R² is ethynyl which comprises contacting respectively a steroid of the formulas:

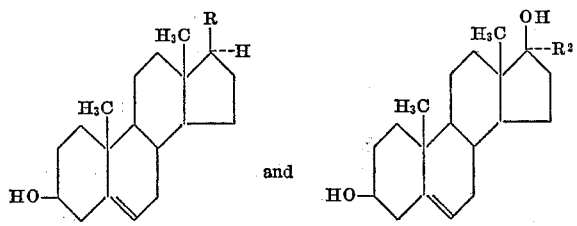

wherein R and R² are as defined above, with a trialkylorthoformate under aqueous acid conditions for a period up to 15 minutes and recovering said compound therefrom.

2. A method of preparing 3β-methoxycholest-5-ene which comprises contacting cholest-5-en-3β-ol- with trimethylorthoformate in the presence of perchloric acid and recovering said compound therefrom.

3. A method of preparing methyl 3β-methoxy-5-etienate which comprises contacting 3β - hydroxy - 5 - etienate with trimethylorthoformate in the presence of perchloric acid and recovering said compound therefrom.

4. A method of preparing methyl-3β-methoxy-bisnorcholenate which comprises contacting 3β-hydroxy-5-bisnorcholenate with trimethylorthoformate in the presence of perchloric acid and recovering said compound therefrom.

5. A method of preparing 3β-methoxy-5-androsten-17β-ol which comprises contacting androst-3-ene-3β,17β-diol with trimethylorthoformate in the presence of perchloric acid and recovering said compound therefrom.

6. A method of preparing 3β-methoxy-17,17-dimethyl-18-norandrosta-5,13-diene which comprises contacting 17α-methyl-5-androstene-3β,17β-diol with trimethylorthoformate in the presence of perchloric acid and recovering said compound therefrom.

7. A method of preparing 17α-ethynyl-3β-methoxy-17β-methyl-18-norandrosta-5,13-diene which comprises contacting 17α-ethynyl-5-androstene-3β,17β-diol with trimethylorthoformate in the presence of perchloric acid and recovering said compound therefrom.

8. A method of preparing 3β-ethoxy-17α-ethynyl-17β-methyl-17-norandrosta-5,13-diene which comprises contacting 17α-ethynyl-5-androstene-3β,17β-diol with trimethylorthoformate in the presence of perchloric acid and recovering said compound therefrom.

9. The compound 17α-ethynyl-3β-methoxy-17β-methyl-18-norandrosta-5,13-diene.

10. The compound 3β-ethoxy-17α-ethynyl-17β-methyl-18-norandrosta-5,13-diene.

11. The compound 3β-octadecyl oxycholest-5-ene.

References Cited

UNITED STATES PATENTS 2,778,840  1/1957  Schaltegger _____ 260—397.2
3,415,852  12/1968  Dusza _____ 260—397.2

OTHER REFERENCES

"Steroids" by Segaloff et al., September 1964, pp. 433–439 relied on. Copy in POSL.

ELBERT L. ROBERTS, Primary Examiner

U.S. Cl. X.R.

260—397.2, 397.5, 999